(12) United States Patent
Karsten

(10) Patent No.: US 6,967,581 B2
(45) Date of Patent: Nov. 22, 2005

(54) BREATH ALCOHOL DETECTION SYSTEM WITH IDENTITY VERIFICATION

(76) Inventor: Harry Karsten, 1811Quail St., Newport Beach, CA (US) 92660

( * ) Notice: Subject to any disclaimer, the term of this patent is extended or adjusted under 35 U.S.C. 154(b) by 0 days.

(21) Appl. No.: 10/898,519

(22) Filed: Jul. 23, 2004

(65) Prior Publication Data

US 2004/0239510 A1 Dec. 2, 2004

Related U.S. Application Data

(60) Provisional application No. 60/560,055, filed on Apr. 7, 2004, provisional application No. 60/560,946, filed on Apr. 9, 2004.

(51) Int. Cl.$^7$ ............................................. G08B 23/00
(52) U.S. Cl. .................. 340/576; 180/272; 340/426.11
(58) Field of Search .......................... 340/576, 426.11; 180/272; 382/118

(56) References Cited

U.S. PATENT DOCUMENTS

| | | | |
|---|---|---|---|
| 4,843,377 A * | 6/1989 | Fuller et al. ................ | 382/118 |
| 4,914,038 A | 4/1990 | Jewitt | |
| 4,916,435 A * | 4/1990 | Fuller ......................... | 382/118 |
| 4,975,969 A * | 12/1990 | Tal ............................. | 382/118 |
| 4,996,161 A | 2/1991 | Conners et al. | |
| 5,729,619 A | 3/1998 | Puma | |
| 6,097,480 A | 8/2000 | Kaplan | |
| 6,229,908 B1 | 5/2001 | Edmonds, III et al. | |
| 6,433,863 B1 | 8/2002 | Weiss | |
| 6,724,920 B1 | 4/2004 | Berenz et al. | |
| 6,748,792 B1 * | 6/2004 | Freund et al. ......... | 340/426.11 |
| 6,778,672 B2 * | 8/2004 | Breed et al. ................ | 382/100 |
| 2003/0117287 A1 | 6/2003 | Crespo | |

* cited by examiner

Primary Examiner—Thomas Mullen
(74) Attorney, Agent, or Firm—McDermott Will & Emery LLP

(57) ABSTRACT

A breath alcohol detection system that prevents operation of a vehicle when an operator's breath alcohol concentration is above a predetermined threshold limit or when the operator's identity is not verified. The device incorporates a breath alcohol detection device that employs an electrochemical fuel cell and an optical skin sensor that positively identifies the operator. The skin sensor is designed to sense skin on the operator's face or in the operator's mouth. Before a vehicle's starter is enabled, the operator must pass a breath alcohol test and the operator must be positively identified. If the breath alcohol test results indicate a breath alcohol concentration above a predetermined threshold, or the operator is not positively identified, the starter is disabled, thus preventing the vehicle from being operated.

19 Claims, 3 Drawing Sheets

BREATH ALCOHOL DETECTION SYSTEM WITH IDENTITY VERIFICATION

CROSS-REFERENCE TO RELATED APPLICATIONS

This application claims the benefit of the filing date of U.S. provisional application Ser. No. 60/560,055 (the "'055 application") filed on Apr. 7, 2004, under 35 USC 119(e). The '055 provisional application was filed by inventor Harry Karsten, entitled "Breath Alcohol Detection System with Simultaneous Facial ID Detection."

This application also claims the benefit of the filing date of U.S. provisional application Ser. No. 60/560,946 (the "'946 application") filed on Apr. 9, 2004, under 35 USC 119(e). The '946 provisional application was filed by inventor Harry Karsten and is also entitled "Breath Alcohol Detection System with Simultaneous Facial ID Detection."

The '055 application and the '946 application are incorporated by reference herein the same as if fully set forth.

BACKGROUND OF THE DISCLOSURE

The present disclosure relates to breath alcohol detection systems and more particularly, to a breath alcohol detection system that verifies the identity of the operator based on information acquired via a skin sensor.

It is well known that intoxicated drivers cause a significant number of accidents and deaths worldwide. Habitual drunk drivers are perceived to be among the most dangerous of these offenders. In the United States, the vast majority of states have established monitoring programs for persons who have been convicted of drunk driving on one or more occasions.

The monitoring programs include monitoring the blood and/or breath alcohol concentration of those convicted of drunk driving, and prohibiting them from driving if it is found that the blood and/or breath alcohol concentration level of the convicted person is above a pre-established threshold limit. The testing is often accomplished by installing a breath alcohol detection device into the offender's automobile which detects the operator's breath alcohol content (BrAC), and if the test results show a BrAC at or above a pre-established threshold, the offender's vehicle is prohibited from starting through an ignition interlock system.

In some states, the statutory BAC level of legal intoxication for all people is 0.08 grams/100 milliliters of blood (equivalent to 0.08 grams/210 liters of breath, or breath alcohol content (BrAC)). With the aforementioned BrAC level, a driver could be convicted of driving while intoxicated. Moreover, once a person has been convicted of driving while intoxicated or driving under the influence, monitoring programs may establish a lesser BrAC level with which convicted drunk drivers must comply before operating a vehicle.

Monitoring programs have employed various breath alcohol detection and/or ignition interlock systems to deter drunk driving. These systems monitor BrAC levels and require the convicted person to comply with a particular BrAC level before being allowed to operate a vehicle. However, an offender is sometimes able to circumvent these systems by having a person other than himself take the breath alcohol test. The offender is then able to start the vehicle and drive, regardless of his BrAC.

Accordingly, some interlock systems have employed mechanisms that render it increasingly difficult for the offender to allow another to perform the breath alcohol test. These interlock systems require that the offender be positively identified before the vehicle's starter is enabled. For example, in published U.S. Patent application no. 2002/0089660 to Weiss, disclosed is an ignition interlock system that employs a retina or eye scanner used in conjunction with a breath analyzer. This system purports to positively identify the user through the retinal or eye scan.

Most monitoring programs require that the operator repeat the test while the vehicle is in operation. These tests are sometimes known as "rolling tests" because the operator is required to take them while the vehicle's tires are moving. During these rolling tests, if the operator is required to fix his or her eyes for the retinal or eye scan, the operator might be distracted from his driving functions.

Accordingly, there is a need for a vehicular breath alcohol detection system that positively identifies the operator, thus preventing persons other than the driver from taking the test. There is further a need for a breath alcohol detection system with identity verification that does not require an operator to fix his eyes in a particular place during a rolling test.

BRIEF SUMMARY OF DISCLOSURE

The present disclosure addresses the needs noted hereinabove by providing a breath alcohol detection system that includes a breath alcohol detection device and a sensor that positively identifies the operator as the offender before enabling the starter of the vehicle in which the ignition interlock system is stored. An ignition interlock apparatus is used to disable the vehicle's starter if the driver is determined to be in an impaired state. Conversely, if the driver's test results indicate a non-impaired state, the vehicle's starter is enabled.

In one aspect of the present disclosure, a breath alcohol detection system is provided. The breath alcohol detection system comprises a skin sensor device capable of determining an operator's skin characteristics by sensing skin on the operator's face or in the operator's mouth, the skin sensor being further capable of generating a skin sensor signal based on sensed skin characteristics.

The breath alcohol detection system also comprises a breath alcohol detection device capable of detecting breath alcohol concentration based on breath alcohol information, the breath alcohol detection device being further capable of generating a breath alcohol signal based on the operator's breath alcohol concentration.

The breath alcohol detection system also comprises a storage medium capable of storing reference skin characteristics and a predetermined breath alcohol threshold level.

The breath alcohol detection system also comprises a comparison device capable of comparing sensed skin characteristics to reference skin characteristics and generating a first comparison signal based on the compared skin characteristics, the comparison device being further capable of comparing detected breath alcohol information to stored breath alcohol information and generating a second comparison signal based on breath alcohol information.

Finally, the breath alcohol detection system comprises circuitry responsive to the comparison device, the circuitry being capable of generating an enable signal and a disable signal, wherein the enable signal indicates a non-impaired state of an operator based on breath alcohol concentration test results and identity verification based on sensed skin characteristics, thus enabling the starting of the vehicle, and wherein the disable signal indicates either an impaired state of the operator based on breath alcohol concentration test results, or nonverification of the operator's identity based on sensed skin characteristics, thus disabling the starting of the vehicle.

It is to be understood that other embodiments of the present disclosure will become readily apparent to those skilled in the art from the following detailed description, wherein it is shown and described only various embodiments of the disclosure by way of illustration. Accordingly, the drawings and detailed description are to be regarded as illustrative in nature and not as restrictive.

BRIEF DESCRIPTION OF DRAWINGS

Aspects of the present disclosure are illustrated by way of example, and not by way of limitation, in the accompanying drawings, wherein:

FIG. 5A is a perspective view of an optical skin sensor used to positively identify the operator of a vehicle in accordance with one embodiment of the present disclosure, while

DETAILED DESCRIPTION OF ILLUSTRATIVE EMBODIMENTS

The present disclosure relates generally to breath alcohol detection systems and more particularly, to breath alcohol detection systems that positively identify an operator, thereby providing protection against an offender who wishes to have another person perform a breath alcohol test.

The system of the present disclosure requires that the operator pass a breath alcohol test and that the operator be positively identified prior to enabling operation of the vehicle. Positive identification may be accomplished by sensing operator skin characteristics and comparing those characteristics to those stored in a database. It has been recognized that accurate tissue spectra of an individual may contain spectral features and combinations of spectral features which are unique to that individual.

Figure 1:
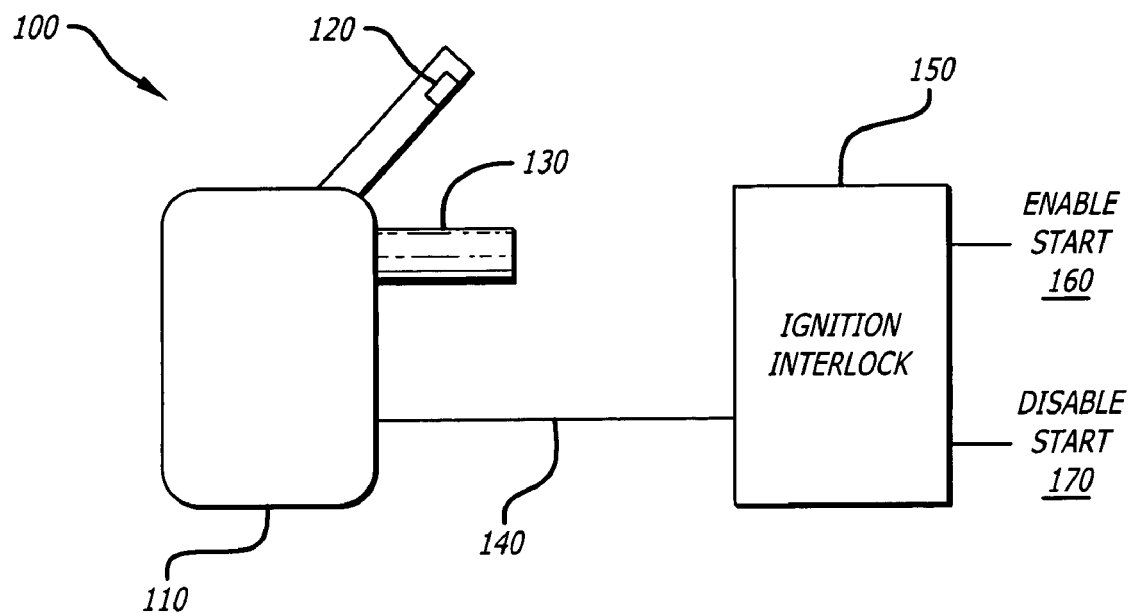
FIG. 1 is a breath alcohol detection system with identity verification capabilities in accordance with one embodiment of the present disclosure.

Referring now to FIG. 1, illustrated is a breath alcohol detection system with identity verification 100 in accordance with one embodiment of the present disclosure. Illustrated are a breath alcohol detection device 110 that includes positioned thereon an optical skin sensor 120 and a breath induction tube 130. Breath alcohol detection device 110 may be hand-held. For example, the device 110 may be six inches (6") tall and three inches (3") wide. The device may also be lightweight for ease of use. Housing for breath alcohol detection device may also be constructed of a weather-resistant material. Weather-resistant material may be, for example, one of a number of high-impact plastics or metals such as those used for cell phones or other handheld devices.

Breath alcohol detection device 110 is operably connected to ignition interlock apparatus 150 via electrical cable 140. Depending on BrAC and identity verification test results, the ignition interlock apparatus 150 then sends a signal to enable starting of the vehicle at enable connection 160 or to disable starting of the vehicle at disable connection 170.

As illustrated, optical skin sensor 120 may be positioned in a location on breath alcohol detection device 110 with respect to breath induction tube 130 so that when an operator lifts the breath alcohol detection device 110 and places his or her mouth onto breath induction tube 130 for a breath test, the sensor 120 is capable of sensing skin characteristics of the operator. In this manner, both the breath alcohol detection and identity verification may occur substantially simultaneously.

Substantially simultaneous detection and identification may provide a safety measure in that, where the operator is required to take rolling tests, the operator is less likely to be distracted from driving the vehicle. Substantially simultaneous detection and identification may provide some protection for law enforcement in that the offender does not have sufficient time to pass the breath alcohol detection device to a sober person before or after performing the steps necessary for identity verification. Likewise, a sober person would have insufficient time to take the breath alcohol test and pass the breath alcohol detection device to the offender for identity verification purposes.

Figure 2:
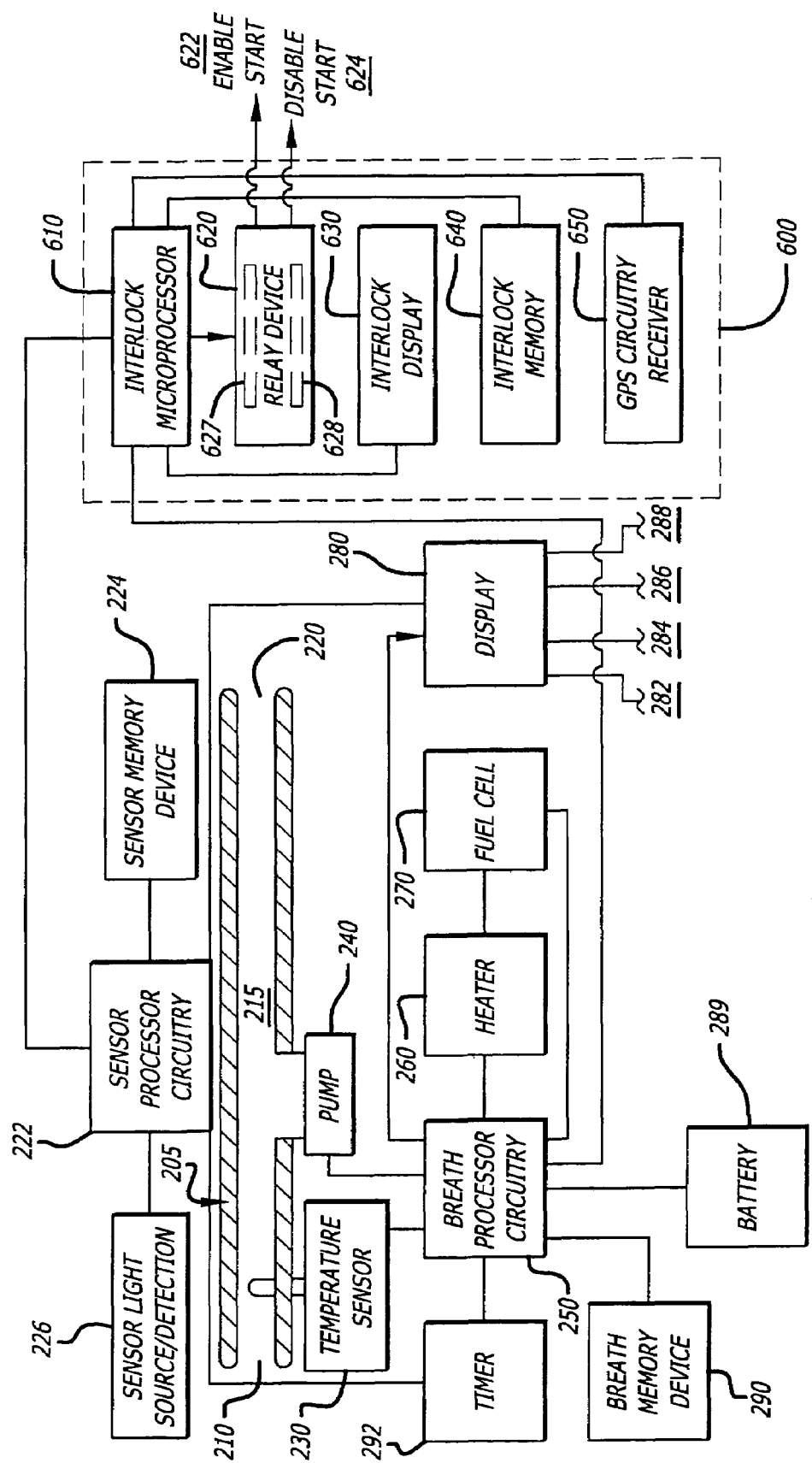
FIG. 2 is a block diagram illustration of components of a breath alcohol detection system in accordance with one embodiment of the present disclosure.

Referring now to FIG. 2, shown is a block diagram illustration of components of a breath alcohol detection system 200. Illustrated are a breath induction tube 205 having an inlet port 210 and exit port 220. Breath induction tube 205 receives the breath of the operator during a breath alcohol test via breath channel 215. Temperature sensor 230 is connected to breath induction tube 205 for measurement of the temperature in breath induction tube 205. Temperature sensor 230 may produce an electrical signal proportional to the temperature detected. Since temperature sensor 230 is electrically connected to breath processor circuitry 250, this temperature signal may be input into the breath processor circuitry 250.

The signal from the temperature sensor 230 may be used to regulate the temperature of electrochemical fuel cell 270. If breath processor circuitry 250 determines that the temperature of fuel cell 270 is lower than a predetermined threshold, it may send a signal to heater 260 to heat fuel cell 270. The predetermined threshold temperature may be stored in breath memory device 290. The heater 260 may regulate the fuel cell temperature at, for example, 104° Fahrenheit (40° Celsius). Breath processor circuitry 250 may be a microprocessor, but it should be understood that other types of processors or computing devices may be used.

Breath memory device 290 may be any type of storage medium including ROMs, RAMs, EPROMs, EEPROMs, flash memory, magnetic or optical cards, floppy disks, optical disks, CD-ROMs, magneto-optical disks, or any type of media suitable for storing electronic instructions or data.

Electrochemical fuel cells are known in the art and have been used to measure breath alcohol concentration. Electrochemical fuel cell 270 detects alcohol, and may be designed to be unaffected by other substances that are likely be found in the human breath, including without limitation, foods, confections, methane and acetone, as well as other substances such as paint and glue fumes.

Also illustrated in FIG. 2 is a pump 240 that may assist in drawing the operator's breath sample. Because an optimal breath alcohol test may take several seconds (for example 5–20 seconds), pump 240 may assist the operator by receiving intake of the operator's expulsion of breath into the breath alcohol detection device. The pump 240 can assist on intake of the breath sample for a few seconds, e.g., the minimum time it takes to accumulate a good sample, or pump 240 could assist on breath intake for as long as it takes to obtain an optimal reading. Pump 240 may be connected to breath processor circuitry 250 which is in turn connected to timer 292. Accordingly, there may be a pre-programmed time for pump usage and circuitry 250 could send a signal for pump to turn off after the predetermined time has lapsed.

The components also include a timer 292 coupled to breath processor circuitry 250. Timer 292, in communication with the breath processor circuitry 250 and breath memory device 290, may be used to program and record times and time intervals for breath alcohol test procedures. Timer 292 may be adjustable and may be used to be certain that a breath test is performed in close time proximity to the starting of the vehicle through the ignition system. Timer 292 may be used for other purposes, e.g., to set a time limit during which breath memory device 290 will store the operator's breath alcohol concentration. After the predetermined time for storage has lapsed, the operator's BrAC and other information may be intentionally erased to provide room for additional data. Similarly, with any memory device described herein, the breath alcohol detection system may be configured to intentionally erase the memory device at a predetermined time to provide room for storage or for any other suitable reason.

The components further include sensor processor circuitry 222 and a sensor memory device 224. Sensor processor circuitry 222 controls and processes information from sensor light source and detection elements 226. Sensor memory device 224 stores sensor-related information such as readings of an operator's skin characteristics and reference skin characteristics taken from the offender. Timer 292, in communication with sensor processor circuitry 222 and sensor memory device 224, may be used to program and record times and time intervals for identity verification procedures.

Sensor memory device 224 may be any type of medium suitable for storing data or electronic instruction including but not limited to ROMs, RAMs, EPROMs, EEPROMs, flash memory, magnetic or optical cards, floppy disks, optical disks, CD-ROMs, magneto-optical disks, or any type of media suitable for storing electronic instructions and data. While, in this embodiment, sensor memory device 224 stores information such as skin sensor characteristics but does not store breath alcohol information or otherwise, it should be understood that one or more of breath memory device 290, sensor memory device 224 and interlock memory 640 could be combined to perform the functions of the breath alcohol detection system as described herein.

The components of the breath alcohol detection system may further include an ignition interlock device 600. The ignition interlock device includes an interlock microprocessor 610, a relay device 620, an interlock display 630, and interlock memory 640 and wireless telemetry and global positioning system circuitry 650. Interlock microprocessor 610 receives breath alcohol readings from breath processor circuitry 250 and compares this information to that stored in interlock memory 640. Interlock memory 640 may include information such as a predetermined threshold BrAC level with which the operator must comply prior to starting the vehicle. Interlock memory 640 may also include the offender's skin characteristics for identity verification, although in this embodiment, the information is stored within the sensor memory device 224.

Interlock display 630 may be visible to the operator and may inform him that a test was successfully passed, that a test was failed, or otherwise. Interlock memory 640 may be any type of media suitable for storing data or electronic instructions, including but not limited to, ROMs, RAMs, EPROMs, EEPROMs, flash memory, magnetic or optical cards, floppy disks, optical disks, CD-ROMs, magneto-optical disks.

According to published information, at least one organization has defined the BrAC level of impairment for all people to be 0.04 grams/100 milliliters of blood (equivalent to 0.04 grams/210 liters of breath). Impairment may include diminution of attention, judgment and control, beginning of sensory-motor impairment and loss of efficiency in finer performance tests.

In the present disclosure, the level of impairment has been predetermined, and the operator must comply with this pre-programmed BrAC threshold. That is, the operator must have a BrAC level less than that established by his monitoring program before starting of the vehicle is enabled. Thus, an operator is impaired if he has a BrAC at or above the pre-programmed BrAC threshold. In some cases, this pre-established level of impairment may be as little as 0.02 grams/210 liters of breath which has been considered zero tolerance according to published information of the National Highway Traffic Safety Administration. In addition, most states currently require ignition interlock devices to be set at 0.03 as the predetermined level for impairment.

If interlock microprocessor 610 determines that the operator has not been properly identified or authorized, or if the microprocessor 610 determines that the operator's BrAC meets or exceeds the established threshold, interlock processor 610 sends a signal to relay device 620 to disable vehicle start. The disable signal is received at connection 624, and the vehicle is not permitted to start.

If interlock microprocessor 610 determines that the operator has been properly identified or authorized, and if the microprocessor 610 determines that the operator's BrAC is below the established threshold, interlock processor 610 sends a signal to relay device 620 to enable vehicle start. While, in this embodiment, processor circuitry 610 performs comparison of the BrAC, but does not perform comparison of sensed skin characteristics, it should be understood that one or more of breath processor circuitry 250, sensor processor circuitry 222 and interlock processor 610 could be combined to perform the functions of the breath alcohol detection device as described herein. The enable signal may be received at connection 624, and the vehicle may be permitted to start.

Interlock 600 may also include wireless telemetry and GPS circuitry 650. This wireless telemetry and GPS circuitry 650 assists in determining the location of the vehicle, the identity of the vehicle's operator, the vehicle's make and model, and the license plate number and the state in which the vehicle was licensed. Any time the driver attempts to start the vehicle, the breath alcohol detection device must be connected to the ignition interlock apparatus 600. Otherwise, the operator will be unsuccessful in his attempt to start the vehicle. If the vehicle is somehow started without a breath test, e.g., jump started, the interlock circuitry will detect this condition and trigger GPS circuitry 650 to automatically transfer a violation condition, by way of wireless telemetry, to a monitoring agency for appropriate action. The ignition interlock connection may also act as a battery charger for the breath alcohol detection device.

A breath alcohol test procedure may be initiated at a pre-programmed date and time (standard or military). The breath processor circuitry 250 may cause the initiation of a breath alcohol test at a pre-programmed date and time. A breath alcohol test may also be initiated at the time the vehicle is to be started or while the vehicle is running.

At the predetermined time for a breath test, the fuel cell heater may be activated and may run for a period of time, e.g., 30 seconds, before the breath processor circuitry 250 sends a signal to display 280 to provide the appropriate visible indication that a test is to begin. Display 280 may have electrical connections 282, 284, 286 that provide distinct visible signals to the operator indicating that a breath test has been initiated, or a breath test has been aborted due to an unsuccessful attempt, or a breath test has been refused due to the operator failing to initiate the procedure after a predetermined time. Electrical connections 282, 284, 286 may be connected to lights with distinct colors indicating that one of these conditions has occurred.

The breath alcohol detection device may be powered by battery 289. The battery may be, for example, a nine volt alkaline battery. Electrical connection 288 may be used to provide an indication to an LED on display 280 that the battery power is low.

Figure 3:
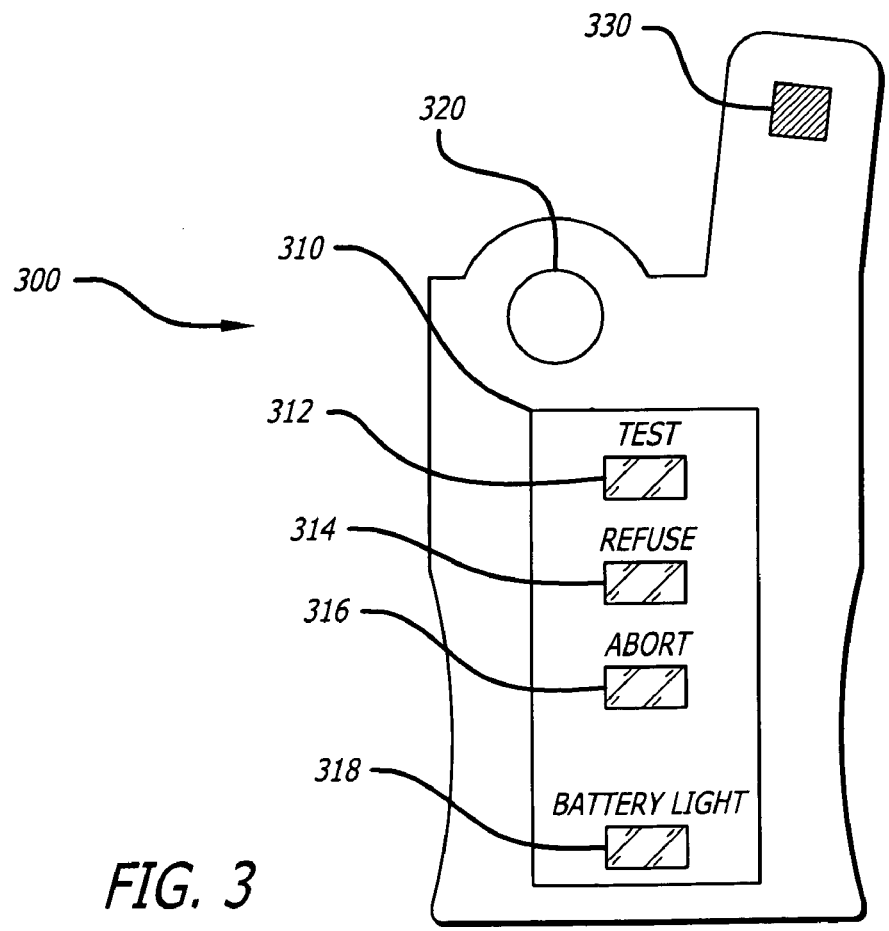
FIG. 3 is a profile of a breath alcohol detection device in accordance with one embodiment of the present disclosure.

Referring now to FIG. 3, illustrated is a profile of the breath alcohol detection device 300 in accordance with one embodiment of the present disclosure. Display panel 310 includes a first visible indicator 312, a second visible indicator 314, a third visible indicator 316 and fourth visible indicator 318.

Because it is possible that a visible indicator may not be immediately seen by the operator (particularly during a rolling test), one or more distinct back-up indicators may be used to notify the operator of the status of a test procedure. These back-up indicators may be audible indicators such as buzzers or alarms. Each back-up indicator could have its own distinct sound. For example, the back-up indicator for the first visible indicator could buzz once, the back-up indicator for the second visible indicator could buzz twice in quick succession, the back-up indicator for the third visible indicator could buzz three times in quick succession, and so on. Because the housing is sufficiently small to be held in the operator's lap, tactile back-up indicators may be used, such as vibrators.

The first visible indicator 312 may be a green light, thus providing a well-known signal to the operator that a breath test procedure has been initiated. This initiation alert may be provided to the operator at the time the vehicle is to be started. Initiation of breath test procedures may also occur while the vehicle is in operation. Such rolling tests have been used by law enforcement to provide some assurance that the operator is not drinking while driving. For example, the initiation procedure could repeat itself at fifteen minute intervals according to a timer in the breath alcohol detection device.

Once the fuel cell heater has been activated, it may run for a predetermined period of time, e.g., 30 seconds, before the first visible indicator 312 on display 310 begins to flash intermittently and buzzer or vibrator also go off intermittently. The first visible indicator 312 may become solid green and back-up buzzer or vibrator may be turned off when the breath test actually commences. Before the breath test commences, a breath induction tube may be placed in opening 320.

Figure 4:
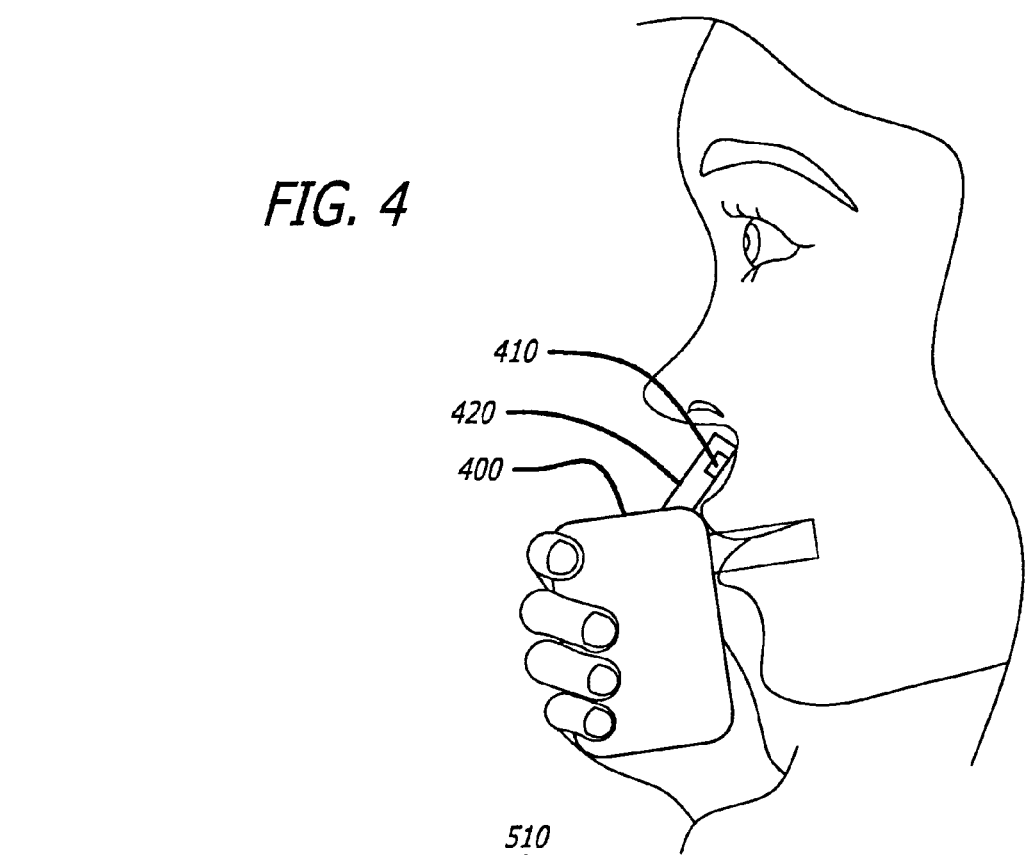
FIG. 4 is an example of how the breath alcohol detection device may be used in accordance with one embodiment of the present disclosure.

Referring now to FIG. 4, illustrated is an example of the breath alcohol detection device 400 in use. When the breath alcohol detection device 400 goes into "ready procedure" for breath testing, the sensor 410 may be held against the operator's chin, cheek, forehead, lips or tongue while the operator's mouth covers the opening. Pressure on the skin sensor 410 may result in a reading that verifies the identity of the operator. The sensor 410 may be held under the nose and the lip as shown. Alternately, the sensor 410 may be held against the cheek, or other portion of the body until the test is complete. Identification sensing arm 420 of detection device 400 may be adjustable, telescopic and fixable so that some flexibility may be provided and so it may be consistently placed at the same location on the operator's skin.

Referring back to FIG. 3, if the optical sensor 330 does not verify the identity of the operator in the "ready procedure" mode, the test is aborted and the third visible indicator 316 begins flashing intermittently ("abort procedure").

In some cases, the amount of breath blown into the device may be insufficient, or the operator may not inject breath for a sufficient amount of time for an accurate reading. Accordingly, the breath test may be aborted, and the user may be instructed to try again. If the breath test is aborted, the third visible indicator 316 may flash intermittently, signaling for another breath test. Third visible indicator 316 may be an amber light.

When the fuel cell has recycled, the first visible indicator 312 begins flashing again, intermittently signaling the device is ready for another test ("ready procedure"). As soon as breath commences, the first visible indicator 312 goes to solid green.

If the breath test is taken successfully, the first visible indicator 312 stays solid, and the third visible indicator 316 does not come on. Second visible indicator 314 may be a red light, indicating a breath test or identity verification was refused.

If breath test is not taken within the predetermined time, e.g., five minutes of signal for initial test, the second visible indicator 314 may intermittently provide such an alert. The device may go into "ready procedure" at fifteen minute intervals until a test is taken. The second visible indicator 314 ceases to alert the operator when breath test is taken successfully. The second visible indicator 314 may be, for example, a red light that indicates a breath test or identity verification test was not taken successfully.

If a battery is used in the breath alcohol detection device 300, fourth visible indicator 318 may be used to alert the operator that the battery is low on power.

The breath alcohol detection device 300 may record in memory the date and time of every successful test and all refused tests. Device calibration data at each successful test may also be recorded in memory. In the present embodiment, aborted tests are not recorded.

Figure 5A:
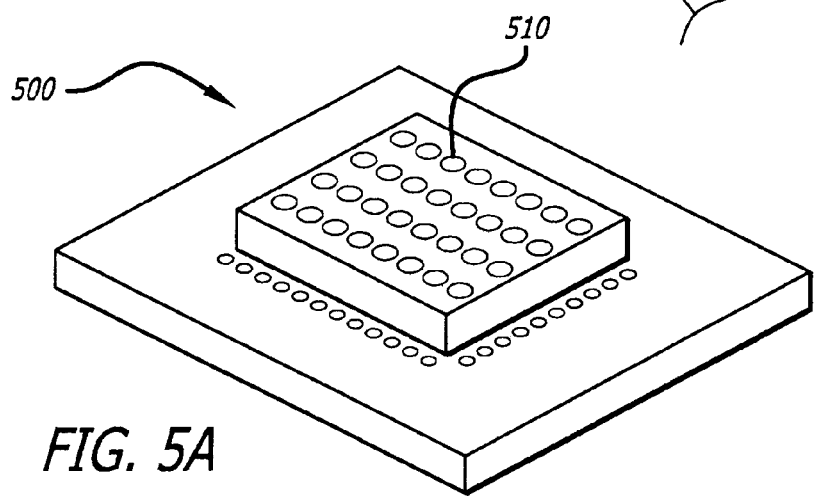

Some convicted drunk drivers have been known to have another person perform the breath alcohol test, and thereafter, drive in an intoxicated state. Accordingly, referring now to FIG. 5A, the present disclosure uses an optical skin and deep tissue sensor 500 to positively identify the operator of a vehicle as an offender. An example of such an optical sensor is the LUMIGUARD.TM biometric sensor, which is commercially sold by Lumidigm, Inc. based in Albuquerque, N. Mex.

The sensor 500 reads information associated with the operator's skin and deep tissue characteristics. The information sensed will be compared to authorized operator skin characteristics as stored in a reference database to positively identify the individual and to electronically authorize the starting of a vehicle. Moreover, the database may include skin characteristics of more than one operator. In this manner, the offender, members of his family and other authorized vehicle operators may be identified. If the authorized operator is not an offender, the system would send an enable signal to the ignition interlock so that such an authorized person could drive the vehicle. Such an individual who is not an authorized offender would not be required to pass a breath alcohol test before the vehicle is started.

If interlock microprocessor 610 determines that the operator has not been properly identified or authorized, or if the microprocessor 610 determines that the operator's BrAC meets or exceeds the established threshold, interlock processor 610 sends a signal to relay device 620 to disable vehicle start. A relay member 628 is responsive to the disable signal. This relay member 628 may be coupled to a vehicle's starter. Relay member 628 may disable starting the vehicle's engine based on impaired breath alcohol concentration test results or unverified skin characteristics. The disable signal is received at connection 624, and the vehicle is not permitted to start.

If interlock microprocessor 610 determines that the operator has been properly identified or authorized, and if the microprocessor 610 determines that the operator's BrAC is below the established threshold, interlock processor 610 sends a signal to relay device 620 to enable vehicle start. Relay member 627 of relay device 620 is responsive to the enable signal. This relay member 627 may be coupled to a vehicle's starter so as to facilitate starting the vehicle's engine based on non-impaired breath alcohol concentration test results and verified skin characteristics. While, in this embodiment, processor circuitry 610 performs comparison of the BrAC, but does not perform comparison of sensed skin characteristics, it should be understood that one or more of breath processor circuitry 250, sensor processor circuitry 222 and interlock processor 610 could be combined to perform the functions of the breath alcohol detection device as described herein. The enable signal may be received at connection 624, and the vehicle may be permitted to start.

Figure 5B:
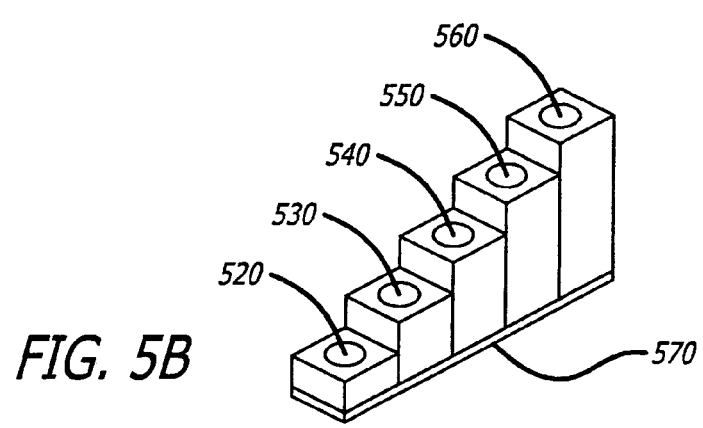
FIG. 5B is a perspective view of the spectrum analyzer with photodetectors in accordance with one embodiment of the present disclosure.

Referring now to FIG. 5B, the sensor also includes a spectrum analyzer 570 having at least one photodetector for converting the light energy into electrical energy. The photodetector may also measure subcutaneous or subepidermal light intensity over a plurality of wavelengths. The number of photodetectors should be sufficient to permit the reading of skin characteristics in adequate detail so that distinct skin characteristics may be determined. In the current embodiment the spectrum analyzer may include, by way of example, five (5) photodetectors 520, 530, 540, 550, 560. The sensor may further include an input-output element, which can include a single lens system for both input and output light energy. The input-output element may be in placed in contact with the operator's skin surface. The sensor may then give a measure of the absorption of light energy by the user's tissue.

Although the embodiment described above measures the quantity of light energy that is diffusely reflected from the tissue by the components or features therein, it should be understood that alternate embodiments could also be implemented, including those that measure the transmission of light energy through the tissue. In any event, the absorption at various wavelengths can be determined by comparison to the intensity of the light energy from the energy source.

The operator's skin characteristics are then compared to authorized operator characteristics as stored in a reference database. The authorized operator characteristics as stored may include subepidermal or subcutaneous spectral data read from the authorized operator's skin and tissue. The authorized operator's skin reading may have been accomplished in the same manner as the actual operator's skin reading. The comparison may be accomplished through a simple algorithm that is performed by a microprocessor stored in memory to a microchip on the sensor. If there is a match between the operator's measured skin characteristics and those stored in the database, the vehicle's starter is enabled.

It should be understood that, in lieu of an optical sensor, other types of skin sensors may be used. These sensors include capacitive sensors which may use electrodes to measure the conductivity of existing pixels. Another type of sensor might be an acoustic or ultrasound sensor that records the skin's surface characteristics with high frequency ultrasound. Thermal line sensors might also be used to chronicle temperature differences over time between the crests and depressions on the skin. Similarly, optical line sensors may be used to measure the capacity or the light, respectively, to build the image.

While the specification describes particular embodiments of the present disclosure, those of ordinary skill can devise variations of the present disclosure without departing from the inventive concept. For example, it should be understood that the concepts described herein can be used in connection with vehicles other than automobiles. It should also be understood that the concepts described herein can further be used to disable any device that permits a transportation device from operating, including a bicycle.

What is claimed is:

1. A breath alcohol detection system having operator identity verification capabilities, comprising:
    a skin sensor device capable of determining a vehicle operator's skin characteristics by sensing skin on the operator's face or in the operator's mouth, the skin sensor being further capable of generating a skin sensor signal based on sensed skin characteristics;
    a breath alcohol detection device capable of detecting breath alcohol concentration based on breath alcohol information, the breath alcohol detection device being further capable of generating a breath alcohol signal based on the operator's breath alcohol concentration;
    a storage medium capable of storing reference skin characteristics and a predetermined breath alcohol threshold level;
    a comparison device capable of comparing sensed skin characteristics to reference skin characteristics and generating a first comparison signal based on the compared skin characteristics, the comparison device being further capable of comparing detected breath alcohol information to stored breath alcohol information and generating a second comparison signal based on compared breath alcohol information;
    circuitry responsive to the comparison device, the circuitry being capable of generating an enable signal and a disable signal;
    wherein the enable signal indicates a non-impaired state of an operator based on breath alcohol concentration test results and identity verification based on sensed skin characteristics, thus enabling the starting of a vehicle, and
    wherein the disable signal indicates either an impaired state of the operator based on breath alcohol concentration test results, or nonverification of the operator's identity based on sensed skin characteristics, thus disabling the starting of a vehicle.

2. The detection system as recited in claim 1, wherein the skin sensor device is an optical skin sensor device.

3. The detection system as recited in claim 2, wherein the skin sensor device is capable of determining an operator's skin characteristics by sensing skin on the operator's cheek.

4. The detection system as recited in claim 2, wherein the skin sensor device is capable of determining an operator's skin characteristics by sensing skin on the operator's lips.

5. The detection system as recited in claim 2, wherein the skin sensor device is capable of determining an operator's skin characteristics by sensing skin on the operator's tongue.

6. The detection system as recited in claim 2, wherein the skin sensor device is capable of determining an operator's skin characteristics by sensing skin on the operator's forehead.

7. The detection system as recited in claim 2, wherein the skin sensor device is capable of determining an operator's skin characteristics by sensing skin in the area of the operator's face below the nose and above the upper lip.

8. The detection system of claim 2, wherein the optical skin sensor further includes a light source that transmits light onto the operator's skin, and a spectrum analyzer having at least one photodetector, the spectrum analyzer being capable of inferring physical properties of the operator's skin based on skin characteristics.

9. The detection system of claim 2, wherein the breath alcohol detection device further includes a breath induction tube, and wherein the optical skin sensor is positioned with respect to the breath alcohol detection system such that when an operator's mouth is placed on the breath induction tube, the optical skin sensor touches at least one of the chin, cheek, forehead, lips, tongue, or the area below the nose and above the upper lip of the operator.

10. The detection system as recited in claim 1, wherein the circuitry further comprises:
 a first relay member responsive to the enable signal, said first relay being coupled to a starter member and facilitating starting said vehicle's engine based on non-impaired breath alcohol concentration test results and verified skin characteristics; and
 a second relay member responsive to the disable signal, said second relay being coupled to a starter member and disabling starting said vehicle's engine based on impaired breath alcohol concentration test results or unverified skin characteristics.

11. The detection system of claim 1, wherein the breath alcohol detection device includes an electrochemical fuel cell that generates an electrical current in response to breath alcohol vapor.

12. The detection system of claim 1, further comprising:
 a display, the display having visible indicators that indicate the status of a breath or identity verification test.

13. The detection system of claim 12, wherein the status information includes initiation of a breath and identification test, abortion of a breath and identification test, and refusal of a breath test.

14. The detection system as recited in claim 1, further comprising:
 wireless telemetry communication and global positioning sysem circuitry capable of communicating the vehicle's location, the vehicle's make and model, the license plate number of the vehicle, and the state in which the vehicle was licensed.

15. The detection system of claim 1, further comprising:
 a battery configured to power the breath alcohol detection system; and
 a display, said display including a visible indicator that indicates when battery power is low.

16. A vehicle interlock system comprising:
 a breath alcohol detection device configured to detect whether breath contains alcohol below a threshold level;
 a skin detection system configured to detect whether facial or mouth skin having predetermined characteristics has been placed in close proximity to the skin detection system, wherein the skin detection system is positioned in close proximity to the breath alcohol detection device such that breath alcohol detection and skin detection occur substantially simultaneously; and
 an ignition interlock system configured to permit ignition of the vehicle when the breath alcohol detection device detects breath containing alcohol below the threshold level and the skin detection system substantially simultaneously detects skin having the predetermined characteristics.

17. A vehicle interlock method comprising:
 detecting whether breath contains alcohol below a threshold level;
 detecting whether facial or mouth skin having predetermined characteristics has been placed in close proximity to a skin detection system; and
 permitting ignition of the vehicle when the breath alcohol detection device detects breath containing alcohol below the threshold level and the skin detection system substantially simultaneously detects skin having the predetermined characteristics.

18. A vehicle interlock system comprising:
 a breath alcohol detection device configured to detect whether breath contains alcohol below a threshold level, the breath alcohol detection system including a breath induction tube configured to be placed against the mouth of an operator of the vehicle;
 an optical skin sensor positioned with respect to the breath induction tube so as to come in close proximity to the chin, cheek, forehead, lip, tongue or the area between the nose and upper lip of the operator when the breath induction tube is placed against the mouth of the operator and configured to detect whether a chin, cheek, forehead, upper or lower lip, tongue or the area between the nose and upper lip has predetermined characteristics; and
 an ignition interlock system configured to permit ignition of the vehicle when the breath alcohol detection system detects breath containing alcohol below the threshold level and the detection system substantially simultaneously detects the close proximity of a chin, cheek, forehead, upper or lower lip, tongue or the area between the nose and upper lip that has the predetermined characteristics.

19. A vehicle interlock method comprising:
 placing a breath induction tube against the mouth of an operator of the vehicle;
 placing an optical skin sensor in close proximity to the chin, cheek, forehead, upper or lower lip, tongue, or area between the nose and upper lip of the operator;
 determining whether breath from the operator that is directed into the tube contains alcohol below a threshold level;
 determining whether the chin, cheek, forehead, upper or lower lip, tongue, or the area between the nose and upper lip of the operator has predetermined characteristics; and
 permitting ignition of the vehicle when the breath alcohol is determined to be below the threshold level at the same time as the chin, cheek, forehead, upper or lower lip, tongue or the area between the nose and upper lip is determined to have predetermined characteristics.

* * * * *